(12) United States Patent
Delgado

(10) Patent No.: US 10,031,402 B1
(45) Date of Patent: Jul. 24, 2018

(54) LIFT SUSPENDER FOR CAMERAS AND THE LIKE

(71) Applicant: Juan M. Delgado, Brooklyn, NY (US)

(72) Inventor: Juan M. Delgado, Brooklyn, NY (US)

( * ) Notice: Subject to any disclaimer, the term of this patent is extended or adjusted under 35 U.S.C. 154(b) by 0 days.

(21) Appl. No.: 15/788,343

(22) Filed: Oct. 19, 2017

Related U.S. Application Data

(60) Provisional application No. 62/412,695, filed on Oct. 25, 2016.

(51) Int. Cl.
  *G03B 17/56* (2006.01)
  *A45F 3/14* (2006.01)

(52) U.S. Cl.
  CPC .............. *G03B 17/561* (2013.01); *A45F 3/14* (2013.01); *A45F 2003/142* (2013.01)

(58) Field of Classification Search
  None
  See application file for complete search history.

(56) References Cited

U.S. PATENT DOCUMENTS

| | | | |
|---|---|---|---|
| 2,643,803 A | | 6/1953 | Bates |
| 3,152,738 A | | 10/1964 | Worsfold |
| 3,884,403 A | | 5/1975 | Brewer |
| 4,125,211 A | | 11/1978 | Handsman |
| 4,155,636 A | * | 5/1979 | Reeberg .................... A45F 5/00 |
| | | | 24/302 |
| 2011/0259929 A1 | * | 10/2011 | Edlebeck ................... A45F 3/14 |
| | | | 224/264 |
| 2014/0259551 A1 | * | 9/2014 | Egbert ....................... A45F 3/14 |
| | | | 24/302 |
| 2015/0355530 A1 | * | 12/2015 | James .................. G03B 17/561 |
| | | | 224/267 |
| 2016/0016058 A1 | * | 1/2016 | Mashburn .............. A63B 55/00 |
| | | | 224/653 |
| 2016/0278536 A1 | * | 9/2016 | Mossman ................. A45F 3/12 |
| 2016/0324322 A1 | * | 11/2016 | Grace ....................... A45F 3/14 |
| 2017/0247915 A1 | * | 8/2017 | Schuur ................ E05B 73/0005 |

OTHER PUBLICATIONS

Anonymous, Binocular/Camera Suspender Harness Strap, Vero Vellini Steiner, ebay, www.ebay.com, date unknown.

\* cited by examiner

*Primary Examiner* — WB Perkey
(74) *Attorney, Agent, or Firm* — Werschulz Patent Law, LLC; Patricia P. Werschulz

(57) ABSTRACT

A lift suspender for cameras and the like which can relieve pressure applied to the user's neck and shoulder area by a neckstrap. The lift suspender includes an adjustable strap connecting to a loop on a second strap and a fastening clip. The loop selectively opens and closes to accommodate and secure the neckstrap. The fastening clip allows the present disclosure to secure onto rear waistband or belt of a user. The adjustable strap allows the user to adjust how much the position of the camera or the like in the user's front. With the camera being lifted and the fastening clip secured to the back of a user's pants and/or belt, the weight of the camera and/or the like is lifted from the neck and shoulder area of the user ultimately relieving pressure.

18 Claims, 6 Drawing Sheets

LIFT SUSPENDER FOR CAMERAS AND THE LIKE

CROSS-REFERENCE TO RELATED APPLICATIONS

This application is a nonprovisional utility application of the provisional patent application, Ser. No. 62/412,695, filed in the United States Patent Office on Oct. 25, 2016 and claims the priority thereof and is expressly incorporated herein by reference in its entirety.

TECHNICAL FIELD

The present disclosure relates generally to a strap/suspender. More particularly, the present disclosure relates to a lift suspender that attaches to a neckstrap of cameras and the like.

BACKGROUND

Both professional and amateur photographers often suspend their cameras by a neckstrap so that the camera is easily accessible and is safe from falling. Other types of photography equipment such as a light meter may also be suspended from a neckstrap.

While photographers routinely use neckstraps, others use neckstraps for different types of equipment. Nature lovers often suspend their binoculars by a neckstrap for the very same reason that photographers do. Bassoon players suspend their instrument from a neckstrap while playing.

In a long day of carrying a camera or other equipment with a neckstrap, the neckstrap may cause a lot of strain on the neck and shoulder area of a user due to the weight of the camera or the like pulling down on the neck and shoulder area. The user can only resort to removing the neckstrap and holding onto the camera or the like with his or her hands to relieve pressure off his or her neck and shoulder area. The same occurs with similar devices such as binoculars which include neckstraps.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide relief to a user's neck when carry a camera or the like around a neck by a neckstrap. Accordingly, an aspect of an example embodiment in the present disclosure provides a lift suspender that attaches to a user's waistband in the rear and to a neckstrap, lifting the camera and the like off the neck of the user.

Another aspect of an example embodiment in the present disclosure is to provide an adjustment to a camera's position when carry a camera around the neck by a neckstrap. Accordingly, the present disclosure provides an adjustable strap in a lift suspender that lifts the camera and the like higher as the lift suspender is adjusted.

Accordingly, the present disclosure describes a lift suspender for cameras and the like which can relieve pressure applied to the user's neck and shoulder area by a neckstrap. The lift suspender includes an adjustable strap connecting to a loop on a second strap and a fastening clip. The loop selectively opens and closes to accommodate and secure the neckstrap. The fastening clip allows the present disclosure to secure onto rear waistband or belt of a user. In another example embodiment, the loop accommodates the belt and the fastening clip attaches to the neckstrap. The adjustable strap allows the user to adjust how much the position of the camera or the like in the user's front. With the camera being lifted and the fastening clip secured to the back of a user's pants and/or belt, the weight of the camera and/or the like is lifted from the neck and shoulder area of the user ultimately relieving pressure.

The present disclosure addresses at least one disadvantage found in the state of the art. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

Figure 1:
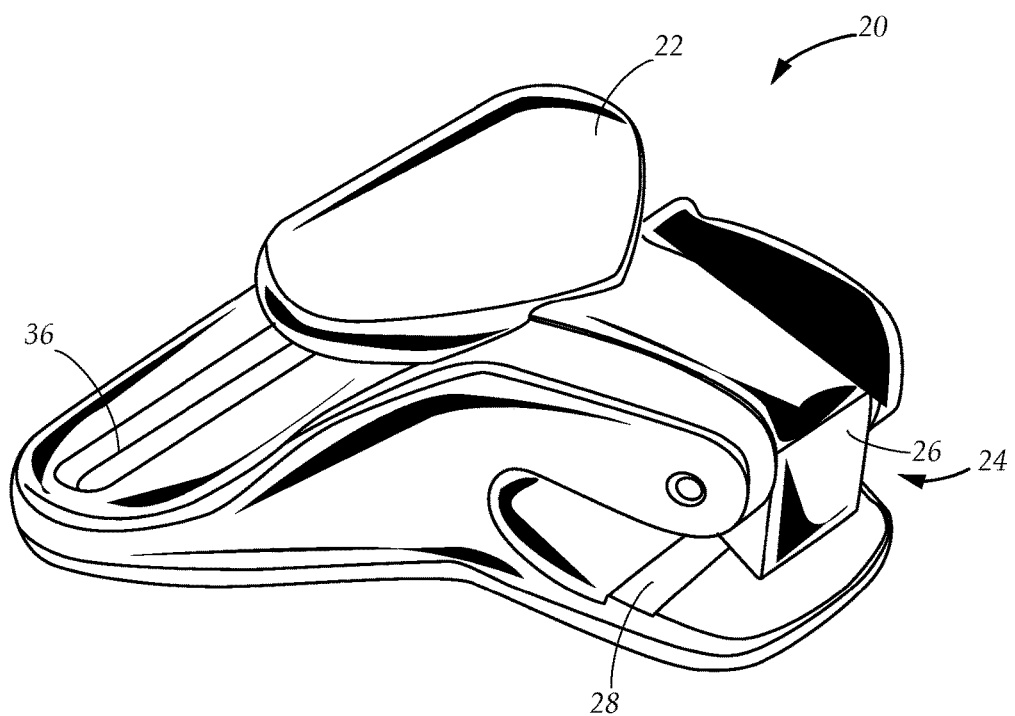
FIG. 1 is a perspective view of an example embodiment of a of a fastening clip in the present disclosure.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE EXAMPLE EMBODIMENTS

Referring to FIGS. 1 to 7, the present disclosure provides an example embodiment of a lift suspender 10 for attaching to a neckstrap 54 that bears a camera, binoculars and like equipment. It is understood by those of ordinary skill that the type of equipment attached to the neckstrap is not a limitation, but for the sake of this discussion, the term camera is used to represent these various types of equipment and encompasses all the like.

The lift suspender 10 preferably attaches to the neckstrap 54 in the rear of a user 50 and to a rear waistband 52 of a user 50. The lift suspender 10 is invertible and is usable in as described above in an preferred example embodiment and inverted in another example embodiment.

The lift suspender 10 comprising a strap 12, an adjusting strap 16, an adjuster 18, a fastening clip 20, a female first connecting element 32 and a male second connecting element 34 of a connector 30. The strap 12 and the adjusting strap 16 may be any length and thickness and are not limitations of the example embodiments presented herein.

The strap 12 has a first end 12E and a second end 12L forming a loop 14. The loop 14 selectively opens and closes. In the preferred example embodiment, the loop 14 opens to accommodate a neckstrap 56 and selectively closes to secure the neckstrap 54 within. In another example embodiment, the loop 14 opens to accommodate a belt worn on the waistband 52 by the user 50. It is understood by those of ordinary skill that the lift suspender is usable in the preferred example embodiment shown in FIG. 7 or inverted. Both methods of wearing and using the lift suspender 10 accomplish the goals of the present disclosure.

The adjuster 16 attaches to the first end 12E of the strap 12.

The adjusting strap 16 has a first end 16F attaching to the fastening clip 20 and a second end 16S connecting to the adjuster 18.

In the preferred example embodiment of the present disclosure, the strap 12 and the adjusting strap 16 is composed of nylon webbing. The strap 12 and the adjusting strap 16 may be composed of any material that is typical of strapping material such as nylon, fabric, neoprene or leather. The material of composition is not a limitation.

Figure 2:
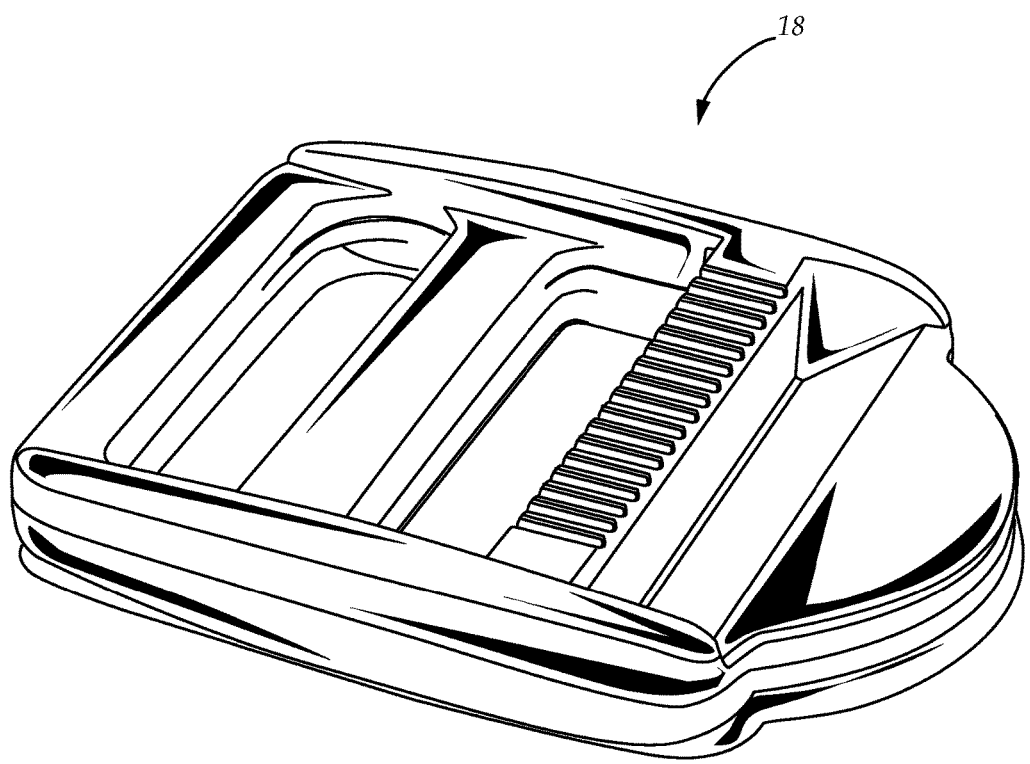
FIG. 2 is a perspective view of an example embodiment of an adjusting section in the present disclosure.

The adjuster 18 is positioned toward the center of the lift suspender 10. The adjuster 18 comprises a plurality of strap openings as shown in FIG. 2. The plurality of strap openings is positioned at the front of the adjuster 18. The strap openings are shaped and sized to receive the strap 12 and the strap passes through the openings. It is understood by those of ordinary skill in the art that the strap adjuster is not limited to the exact configuration shown.

Referring to FIG. 1, the fastening clip 20 is not limited in size or material of composition. The fastening clip 20 comprises a clasp 24, a lever 22 and a fastening clip loop 36 attaching to the first end 16F of the adjusting strap 16.

The clasp 24 of the fastening clip 20 has at least one notch 28 and a catch 26 in cooperation with the at least one notch 28. The fastening clip 20 has a lever 22 configured for opening the clasp 24 by separating the catch 26 from the at least one notch 28. In the preferred embodiment, the clasp 24 of the fastening clip 20 is configured for attaching to a rear portion of a waistband 52 of a user 50. In another example embodiment, the clasp 24 is configured for attaching to the neckstrap 54 when the lift suspender is used in the inverted position.

Figure 3:
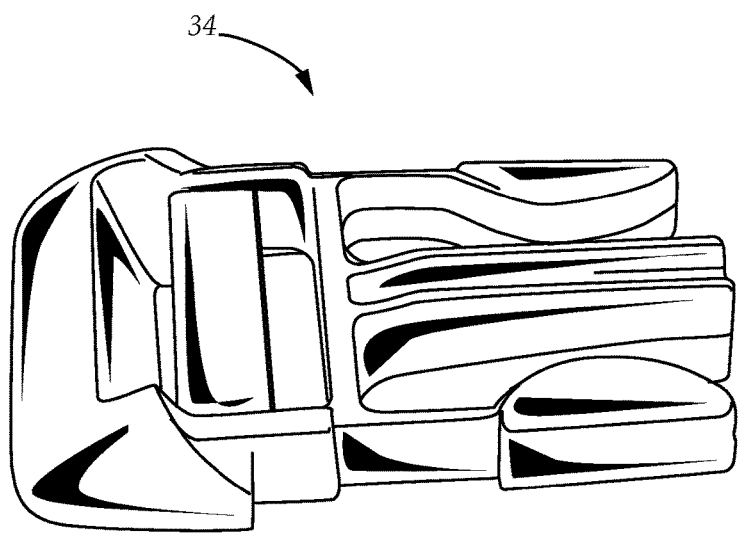
FIG. 3 is perspective view of an example embodiment of a male connector in the present disclosure.
Figure 4:
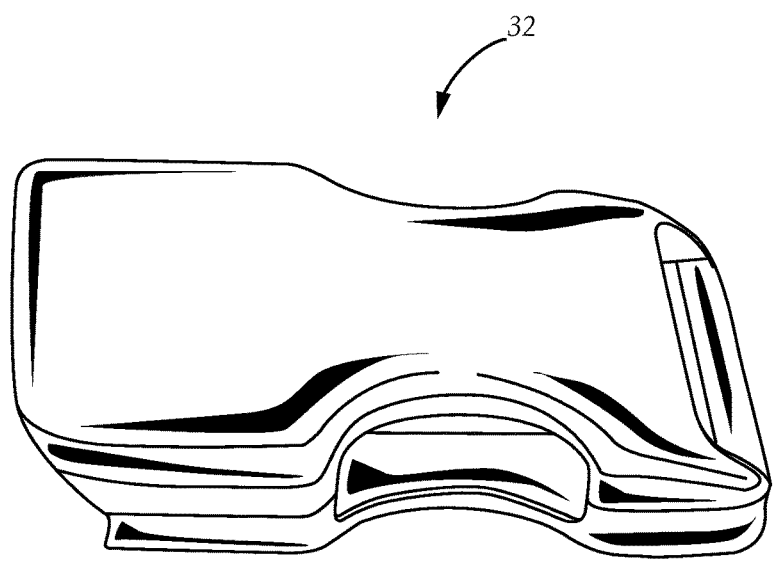
FIG. 4 is a perspective view of an example embodiment of a female connector in the present disclosure.
Figure 5:
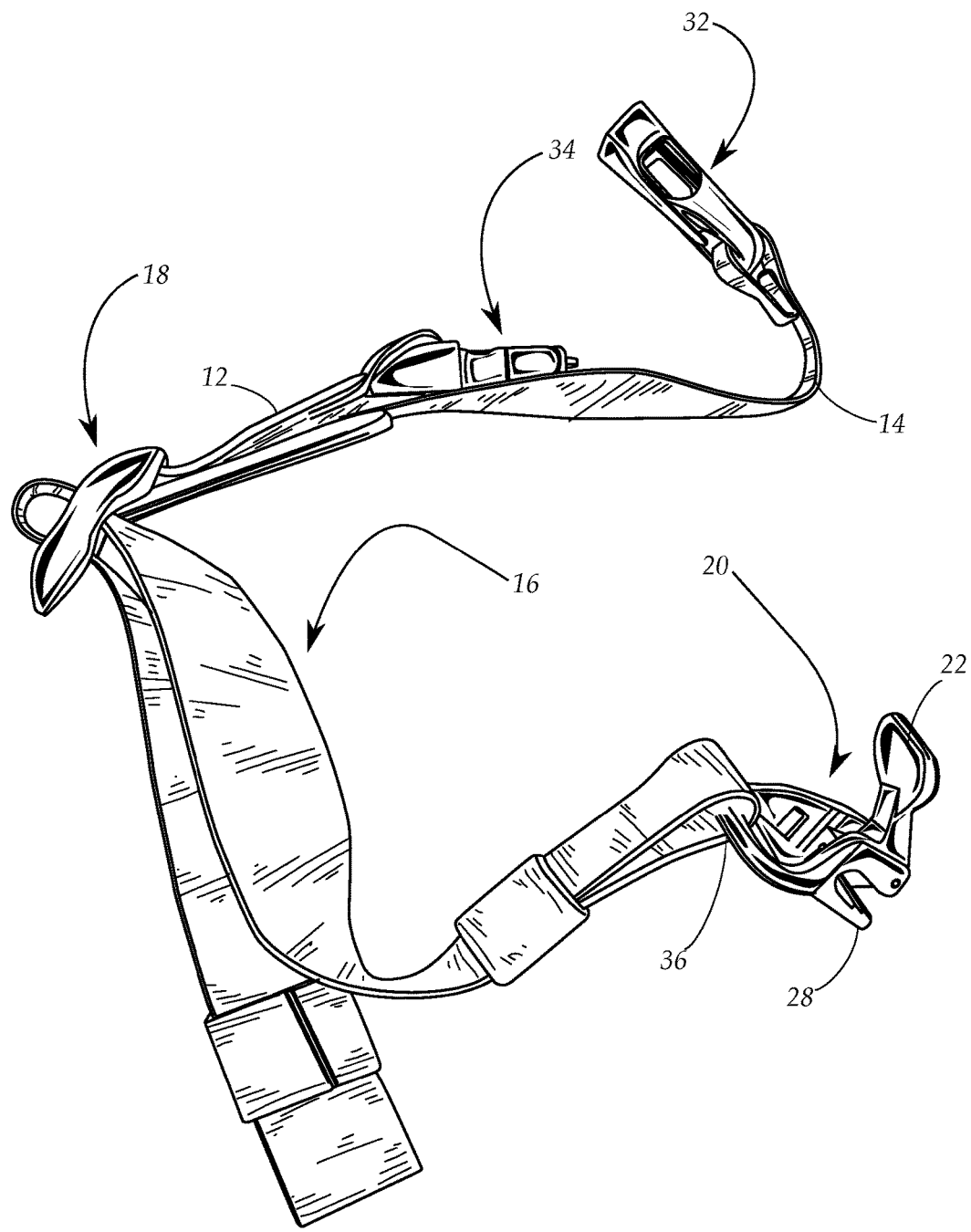
FIG. 5 is a perspective side view of an example embodiment of an assembled lift suspender in the present disclosure.
Figure 6:
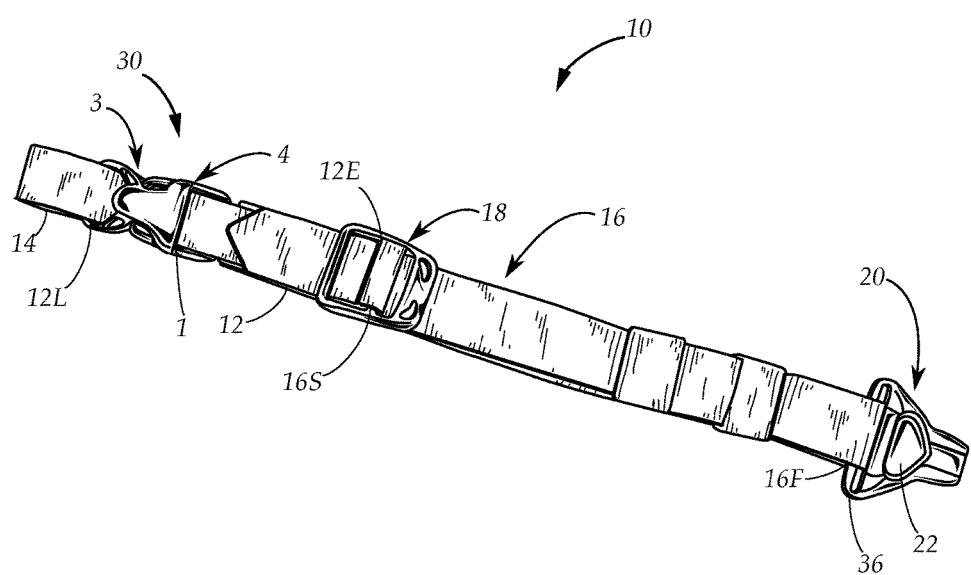
FIG. 6 is a front elevation view of an example embodiment of the assembled lift suspender in the present disclosure.
Figure 7:
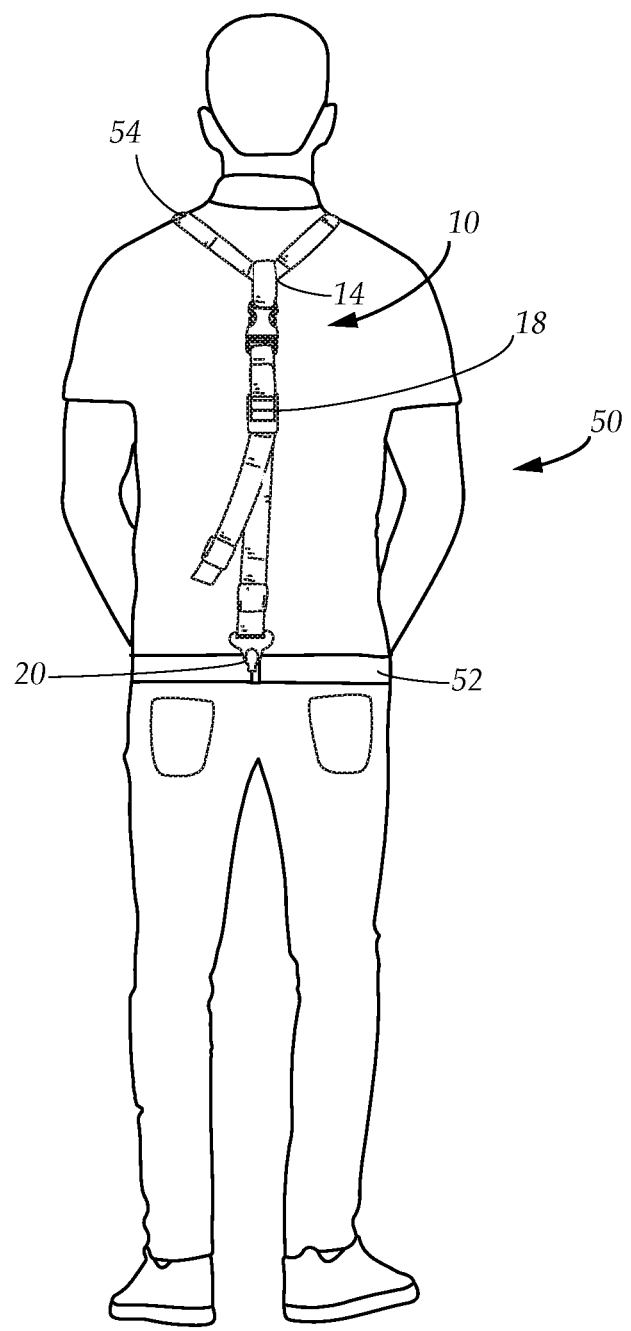
FIG. 7 is a rear elevational view of a user wearing an example embodiment of the lift suspender in the present disclosure.

Referring to FIGS. 3 and 4, the connector 30 has a pair of connecting elements, a first connecting element 32, shown as a female connecting element attaching to the second end of the strap 12 and a second connecting element 34 shown as a male connecting element, attaching to the strap 12 above the adjuster 18, wherein the connector 30 selectively closes the loop 14 when the first connecting element 32 connects to the second connecting element 34 as shown in FIGS. 5 and 6.

The drawings show a buckle connector; however, those of ordinary skill in the art appreciate that the connector 30 is selected from the group of connectors consisting of a snap, a buckle, a hook and loop fastener, a button and buttonhole and hook and eye closure as well as other similar connectors.

A method of carrying the camera or the like having the neckstrap 56 by using the lift suspender 10 comprises opening the loop 14 on the second end 12L of the lift suspender 10 and accommodating the neckstrap 56, then closing the loop 14 thereby securing the neckstrap 56 within the loop 14. The user 50 places the neckstrap 56 on his or her neck. It is understood by those of ordinary skill in the art that the user 50 can place the neckstrap 56 on his or her neck first and then attach the loop 14 as described hereinabove.

With the lift suspender 10 in place on the neckstrap 56, the fastening clip 20 of the lift suspender 10 is attached to the waistband 52 of the user 50, the fastening clip 20 opposite the loop 14 of the lift suspender 10. The user then adjusts the lift suspender 10 to the desired length, using the adjuster 18 to adjust the adjusting strap 16, raising or lowering the camera or the like to the desired position.

The step of attaching the fastening clip 20 of the lift suspender 10 to the waistband 52 of the user 50 includes opening the clasp 24 on the fastening clip 20 by lifting the lever 22 on the fastening clip 20, the lever 22 opening the clasp 24 by separating the catch 26 from at least one notch 28, placing the open clasp 24 on the waistband 52 and closing the clasp 24 by lowering the lever 22 thereby connecting the at least one notch 28 and the catch 26.

In another example embodiment, the step of opening the loop 14 on the second end of the lift suspender 10 accommodates the belt of the user 50, the step of closing the loop 14 secures the belt within the loop 14 and the step of attaching the fastening clip 20 of the lift suspender 10 attaches the lift suspender 10 to the neckstrap 56.

It is understood that when an element is referred hereinabove as being "on" another element, it can be directly on the other element or intervening elements may be present therebetween. In contrast, when an element is referred to as being "directly on" another element, there are no intervening elements present.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein regarding cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a lift suspender. The disclosure is illustrated by example in the drawing figures, and throughout the written description. It should be understood that numerous variations are possible, while adhering to the inventive concept. Such variations are contemplated as being a part of the present disclosure.

What is claimed is:

1. An invertible lift suspender for attaching to a neckstrap of a camera, comprising:
    a fastening clip;
    a strap having a first end and a second end forming a loop, the loop selectively opening and closing;
    an adjuster attaching to the first end of the strap; and
    an adjusting strap having a first end attaching to the fastening clip and a second end connecting to the adjuster.

2. The invertible lift suspender as described in claim 1, wherein the loop of the strap selectively opens to accommodate a neckstrap and selectively closes to secure the neckstrap within.

3. The invertible lift suspender as described in claim 1 wherein the loop of the strap selectively opens to accommodate a belt worn by a user and selectively closes to secure the belt within.

4. The invertible lift suspender as described in claim 1, further comprises a connector having a pair of connecting elements, a first connecting element attaching to the second end of the strap and a second connecting element attaching to the strap above the adjuster, wherein the connector selectively closes the loop when the first connecting element connects to the second connecting element.

5. The invertible lift suspender as described in claim 1, wherein the fastening clip has a clasp, the clasp having at least one notch and a catch, and the fastening clip has a lever configured for opening the clasp by separating the catch from the at least one notch.

6. The invertible lift suspender as described in claim 5, wherein the clasp of the fastening clip is configured for attaching to a rear portion of a waistband of a user.

7. The invertible lift suspender as described in claim 5, wherein the clasp of the fastening clip is configured for attaching to a neckstrap.

8. A lift suspender for attaching to a neckstrap of a camera and the like, comprising:
    a fastening clip having a lever and a clasp, the lever selectively opening and closing the clasp;
    a strap having a first end and a second end forming a loop, the loop selectively opening and closing;
    a connector configured for selectively opening and closing the loop;
    an adjuster attaching to the first end of the strap; and
    an adjusting strap having a first end attaching to the fastening clip and a second end connecting to the adjuster.

9. The lift suspender as described in claim 8, wherein the loop of the strap is configured to selectively open to accommodate a neckstrap and to selectively close to secure the neckstrap within.

10. The lift suspender as described in claim 9, wherein the connector has a pair of connecting elements, a first connecting element attaching to the second end of the strap and a second connecting element attaching to the strap above the adjuster, wherein the connector selectively closes the loop when the first connecting element connects to the second connecting element.

11. The lift suspender as described in claim 10, wherein the connector is selected from the group consisting of a snap, a buckle, a hook and loop fastener, a button and buttonhole and hook and eye closure.

12. The lift suspender as described in claim 11, wherein the clasp of the fastening clip is configured for attaching to a rear portion of a waistband of a user.

13. The lift suspender as described in claim 12, wherein the clasp has at least one notch in cooperation with a catch.

14. A method of carrying a camera or the like having a neckstrap, comprising:
    opening a loop on an end of a lift suspender and accommodating a neckstrap of a camera;
    closing the loop thereby securing the neckstrap within the loop;
    placing the neckstrap on a neck of a user; and
    attaching a fastening clip of the lift suspender to a waistband of the user, the fastening clip opposite the loop of the lift suspender.

15. The method as described in claim 14, wherein the step of attaching the fastening clip of the lift suspender to the waistband of the user is followed by the step of adjusting the lift suspender to a desired length.

16. The method as described in claim 15, wherein the fastening clip attaches to an adjusting strap, a first end attaching to the fastening clip and a second end attaching to an adjuster and the step of adjusting the lift suspender includes adjusting the adjusting strap with the adjuster.

17. The method as described in claim 14, wherein the step of attaching a fastening clip of the lift suspender to a waistband of the user includes opening a clasp on the fastening clip by lifting a lever on the fastening clip, the lever opening the clasp by separating a catch from at least one notch, placing the open clasp on the waistband and closing the clasp by lowering the lever thereby connecting the at least one notch and the catch.

18. The method as described in claim 14, wherein the step of opening loop on an end of a lift suspender accommodates the belt of the user, the step of closing the loop secures the belt within the loop and the step of attaching a fastening clip of the lift suspender attaches the lift suspender to the neckstrap.

\* \* \* \* \*